United States Patent [19]

Brodersen et al.

[11] Patent Number: 4,828,323

[45] Date of Patent: May 9, 1989

[54] ADJUSTABLE ARMREST

[75] Inventors: Cole T. Brodersen, Davenport; Danny S. Foster, Bluegrass, both of Iowa

[73] Assignee: Sears Manufacturing Company, Davenport, Iowa

[21] Appl. No.: 209,350

[22] Filed: Jun. 20, 1988

[51] Int. Cl.$^4$ .............................. A47C 7/54; B60N 1/06
[52] U.S. Cl. .............................. 297/417; 74/501.5 R; 74/527; 74/535; 248/118; 248/284
[58] Field of Search .............. 297/163, 165, 411, 417; 248/118, 118.3, 281.1, 284; 74/535, 501.5 R, 501.6, 527

[56] References Cited

U.S. PATENT DOCUMENTS

| | | | |
|---|---|---|---|
| 1,929,471 | 10/1933 | Bank | 297/304 |
| 3,335,621 | 8/1967 | Buchwald | 74/535 |
| 4,244,623 | 1/1981 | Hall et al. | 297/417 |
| 4,307,913 | 12/1981 | Spiegelhoff | 297/417 |
| 4,310,196 | 1/1982 | Vogel | 297/417 |
| 4,351,562 | 9/1982 | Twitchell et al. | 297/349 |
| 4,621,864 | 11/1986 | Hill | 297/411 |

FOREIGN PATENT DOCUMENTS 3344707 6/1985 Fed. Rep. of Germany ...... 297/417

Primary Examiner—Kenneth J. Dorner
Assistant Examiner—Brian K. Green
Attorney, Agent, or Firm—Niro, Scavone, Haller & Niro, Ltd.

[57] ABSTRACT

An armrest assembly is self-adjusting as to height in response solely to the rotation of a connecting support lever to which an armrest is mounted. The adjustment mechanism includes a spring biased latch pawl engaging a ratchet wheel inside the support lever. The spring holds the pawl engaged to the ratchet when the support lever is rotated in one direction; the spring holds the ratchet wheel and pawl in disengagement when it is rotated in the other direction. The ratchet remains fixed relative to the movement of the armrest portion and the support lever. An adjustable cable running from the ratchet wheel through the support lever and into the armrest portion maintains the armrest portion in a horizontal position and provides adjustment above and below the horizontal.

19 Claims, 2 Drawing Sheets

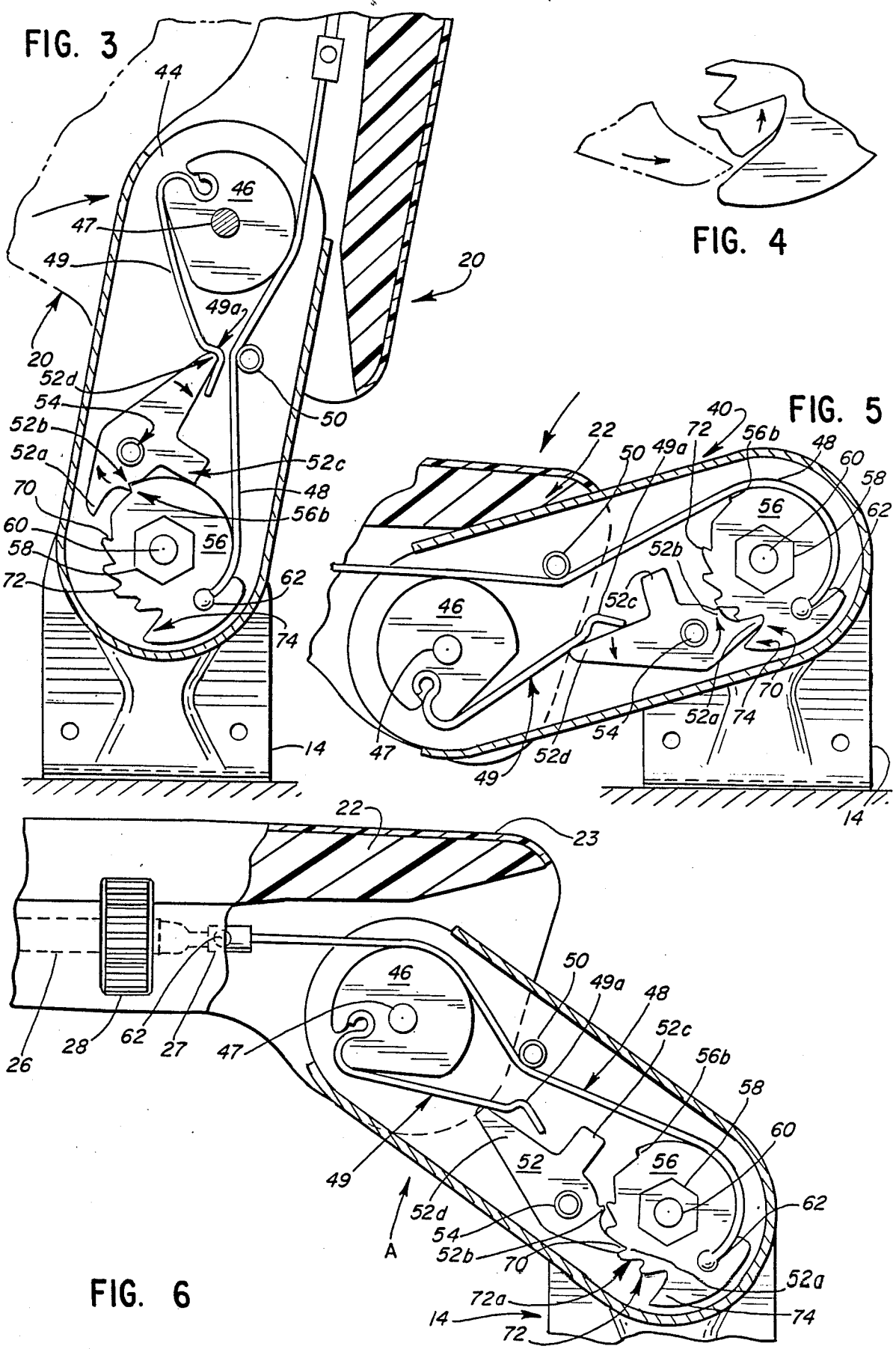

ADJUSTABLE ARMREST

BACKGROUND OF THE INVENTION

The present invention is directed to an adjustable armrest for a vehicle seat.

Armrests are frequently employed on vehicle seats, especially in trucks, agricultural vehicles, and other off-road vehicles. The armrest not only provides support for the operator's arm; it also provides lateral support for the body. In both ways, comfort is increased and fatigue is lessened. To obtain maximum benefit from the armrest, it should be adjustable, both as to height and slope. Also, since many vehicles have confined cabs, it is desirable that the armrest have a sufficient range of movement to allow easy access to the vehicle cab and seat. Finally, the armrest mechanism should be simple and rugged to withstand severe working conditions including shocks, dirt or dust, and still require little maintenance.

Attempts have been made to address some of these problems by providing an armrest which can be moved to a variety of positions to allow access to a truck cab, accommodate users of different sizes, and—when fully lowered—increase seat width. Many of these prior art mechanisms are complex and usually require a significant number of parts. Other adjustable armrests provide only a single operable position of the armrest support between the extreme raised and lowered positions, with perhaps the addition of a limited range of vertical movement of the armrest through manually operated knobs. Such a device is described in U.S. Pat. No. 4,097,088 to Meiller.

Available devices also suffer from other disadvantages. Some devices combine the structure which guides the armrest through its vertical or rotary movement with the structure which holds the armrest in a particular position; this can hamper smooth operation of the armrest. Such devices ca also require that a latch or locking mechanism be released separately before moving the armrest assembly in any direction, such as by lifting the armrest before it can otherwise be moved. In still other devices, the locking mechanism must be manually latched or unlatched when moving the armrest assembly through different positions, as is necessary in the folding armrest described in U.S. Pat. No. 4,496,190 to Barley.

SUMMARY OF THE INVENTION

The present invention preserves the advantages of other prior art adjustable armrest mechanisms. It also provides new advantages not currently available, and overcomes some of the disadvantages of prior art devices.

The invention is generally directed to an adjustable armrest for a vehicle seat. The invention includes unique structural features which permit it to be easily used in confined spaces, and maintained in a proper position with respect to a seat.

In the preferred embodiment of the armrest assembly, a support lever is pivotally mounted to a fixed component, such as a bracket. An armrest is pivotally connected to the other end of the support lever. A latch means comprises a ratchet wheel or latch hub and pawl to maintain the support lever at one of a plurality of positions representing different vertical heights of the armrest. A biasing spring keeps the ratchet wheel and pawl engaged at each position until the support lever reaches it uppermost position. Then an abutment means overcomes the engaging force of the biasing spring and rotates the pawl out of engagement with the ratchet wheel. A notch at the end of the biasing spring maintains the ratchet and pawl in a disengaged state once the support lever has been rotated as far upward a possible. The notch of the spring is disengaged from the rear of the pawl as the front tip of the pawl contacts an oversized reengagement tooth on the ratchet wheel when the support lever is moved downward to its lowest position.

The separation of the armrest of the assembly and the locking structure inside the support lever accomplishes one object of the invention by maintaining uniform movement of the device. There are no outside triggers or buttons that can pinch a user or break. The latching or unlatching of the ratchet and pawl are controlled only by the movement of the support lever.

Another advantage is that the armrest is maintained in a horizontal orientation by a tensioning means or cable, thus eliminating moving parts such as those in a parallelogram linkage. There is also a control knob connected to the cable by a threaded shaft that can adjust the orientation of the armrest within a range slightly above and below the horizontal. Still another reduction in parts occurs because a spring is used to provide both an engaging and disengaging force to the pawl.

The compact design functions more easily than the known prior art devices. It is less expensive to make and easier to manufacture. There are no large side brackets required to permit or assist vertical movement and there are fewer parts. The armrest assembly is easily adaptable to almost any seat.

DESCRIPTION OF THE DRAWINGS

The novel features which are believed to be characteristic of the invention are set forth in the appended claims. The invention itself, however, together with further objects and attendant advantages, will be best understood by reference to the following description taken in connection with the accompanying drawings, in which:

FIG. 3 is a side elevation in partial cross section showing the support lever rotated to its uppermost position with the latch pawl and ratchet wheel have disengaged;

FIG. 4 is an enlarged partial cross section showing how the tip of the latch pawl contacts the oversized reengagement tooth as the latch means reengages into the first latched position;

FIG. 5 is a partial cross section depicting the lowest possible position of the armrest; and FIG. 6 is a partial cross section that shows the engaged latch elements inside the support lever while the armrest is at one of its intermediate heights.

DESCRIPTION OF THE PREFERRED EMBODIMENT

Figure 1:
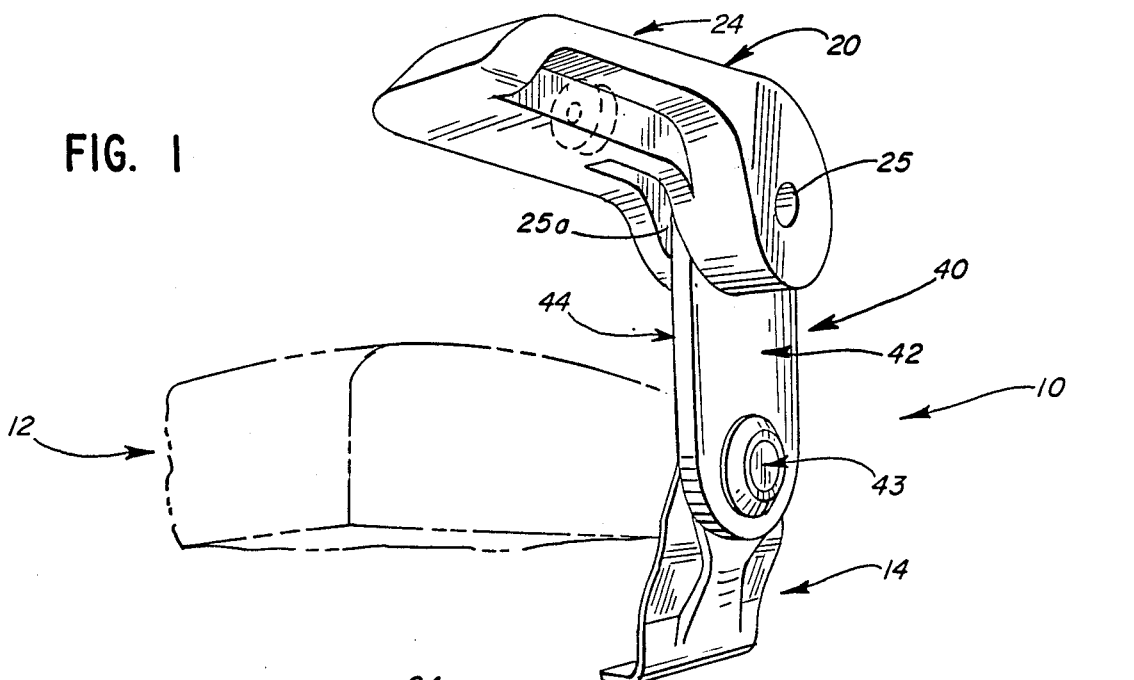
FIG. 1 is a perspective view of the armrest assembly adjacent to a seat shown in phantom.

The preferred embodiment of this invention will be described as the left-hand armrest assembly for a truck seat as depicted in the drawings. Descriptive directional words—up, down, clockwise, counterclockwise—are made with reference to the side views in FIGS. 2-6. The assembly 10 is comprised of two principal pieces: the armrest 20 and the support lever 40. The lower end of the support lever 40 pivots about a fixed point. The fixed point might be a pivot connecting the support lever directly to the frame (not shown) of a seat 12. In the preferred embodiment the support lever 40 is connected by a pivot pin 60 (FIG. 2) to a bracket 14. The bracket is fixed to the frame of the seat 12 or the truck-cab floor (not shown), and thus is easily adaptable to virtually any kind of seat. The armrest 20 pivots at its rear end about shoulder bolt 47, which connects armrest 20 with support lever 40.

Rotation of the support lever 40 sets the vertical position of the armrest 20. No external buttons, triggers, knobs or other mechanisms are required. Successively higher positions of the support lever are obtained by rotating the support lever 40 clockwise (as depicted in these figures) to engage a latch pawl 52 with a latch hub or ratchet wheel 56. This is illustrated by the sequence of support lever positions illustrated in FIGS. 5, 6, and 2. The ratchet wheel 56 includes a plurality of teeth 72, each of which establishes a different position of the support lever 40, and thus a different vertical height of the armrest 20. Only one mechanism is necessary to set the armrest in any position; abutments affixed to the seat and other such devices for positioning the armrest are unnecessary because the locking means for the intermediate positions are the same as for the extreme high and low positions.

While the support lever 40 pivots through a variety of positions, the armrest stays generally horizontal. This is effected by a tension member such as cable 48, which is attached at one end by a knob 62 to the ratchet wheel 56 in the support lever 40. The other end of the cable 48 is connected to the armrest 20 with a knob 62 that is attached to an adjusting shaft 26 by a roll pin 27. The armrest 20 is maintained horizontally because the cable 48 acts as a parallelogram linkage. A nut 58 maintains the ratchet wheel 56 in fixed relation to the bracket 14 as the support lever 40 rotates through different positions. A shoulder bolt 47 and locknut (not shown) secure the cable 46 in fixed relation to the support lever 40. Thus, as the support lever 40 is rotated, the cable 48 between the cable hub 46 and the ratchet wheel 56 represents one rotating leg of the parallelogram linkage. The horizontal leg of the parallelogram linkage is comprised of the cable 48 between the cable hub 46 and the roll pin 27 and the adjustable shaft 26. The shaft wheel 28 is a knurled plastic knob in space 30 that can adjust the tension in cable 48. This provides two functions. First, it is difficult to manufacture the cable 48 so precisely that the armrest 20 is horizontal when the cable 48 is assembled into the completed device. Second, the knob 28 and shaft 26 permit a driver to adjust the arm a few degrees above or below the horizontal if he so desires. The pivot 50 between the inner arm cover 44 and the outer arm cover 42 has been found to regulate the tension in the cable 48 in a manner superior to that of merely running the cable 48 from the ratchet wheel 56 directly to the cable hub 46.

The armrest 20 itself is comprised of a body 22 with a top flange 23. The body 22 and the interior mechanical components of the armrest 20 are covered with a polyurethane foam 24. The exterior part of the adjusting shaft 26 can be welded or otherwise fixedly attached to the body 22, so the interior, externally threaded portion of the adjusting shaft 26 can be moved to adjust the cable 48. A flat washer (not shown) is placed in space 30 adjacent shaft wheel 28. The slot 25a in FIG. 1 permits the proper assembly alignment of the armrest 20 and the hole 25 allows the armrest 20 and support lever 40 to be secured by shoulder bolt 47 and the unshown locknut.

The support lever 40 is comprised of the outer arm 42 and inner arm 44. The exact functioning of the armrest support lever 40, as the adjustment mechanism of the armrest assembly, will be seen by examining the movement of the support lever 40 through a complete cycle of movements. The rotational force required to move the support lever 40 can be applied directly, but more typically this is done by the seat occupant applying the necessary horizontal force to the armrest 20 in one continuous motion. The shoulder bolt 47 connection then applies the necessary rotational force to the support lever 40.

The lowest fixed position of the armrest assembly 10 is represented by FIG. 5. The pawl 52 is securely engaged with the lowest interlocking gear slot 70 of ratchet wheel 56. The pawl 52 is free to pivot about pin 54. In this instance, however, biasing spring 49 applies a rotational force (as noted by the arrows on pawl 52) to the rear of pawl 52. The pawl 52 and the gear 70 of the ratchet wheel 56 are thus lockingly engaged to prevent counterclockwise rotation of the support lever 40. FIG. 5 demonstrates a configuration of the armrest assembly 10 whereby the armrest 20 is approximately parallel and adjacent to the seat 12 (not shown), so that the armrest effectively becomes part of a widened seat.

To raise the armrest 20 requires the application of a rotational force upon the support lever 40 as shown by the arrow A in FIG. 6. This can be done by applying a horizontal force on the armrest. No double motions, such as lifting the armrest to unlock the support lever coupled with a rotation of both the armrest and support lever, are necessary. It should be noted that the ratchet wheel 56 remains fixed relative to bracket 14. This is accomplished by the locknut 58 secured to the bolt 60 that run between the bracket 14 and the support washer assembly 43. Thus, the knob 62 at the end of cable 48, also remains stationary. The pawl 52, pivots 50 and 54, spring 49, cable hub 46, cable 48, and shoulder bolt 47 generally rotate with the support lever 40. The spring 49 continues to urge the pawl 52 into locking engagement with the ratchet wheel 56. As the lever 40 is rotated clockwise, however, the rotational force causes the tip 52a of the pawl 52 to slide over the edge 72a of the teeth 72 of ratchet wheel 56. As the bottom edge and tip 52a of the pawl 52 slide over the top of one tooth 72, the biasing spring 49 forces the pawl 52 into the next position of locked engagement with the gear slot 70 ratchet wheel 56. As the pawl 52 and ratchet wheel 56 engage forcibly because of the spring 49, a clicking sound is typically heard.

Figure 2:
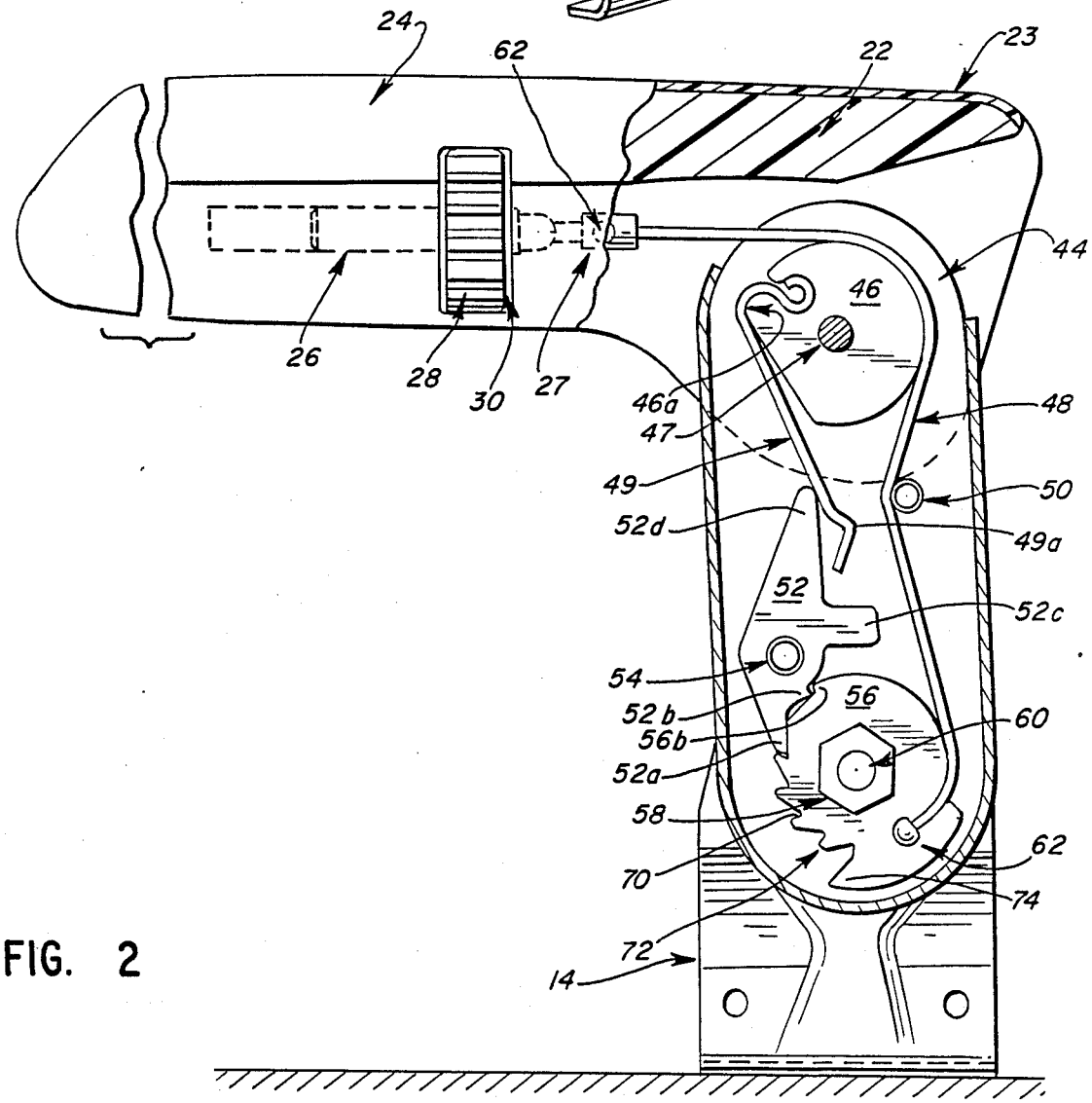
FIG. 2 is a side elevation, in partial cross section, of the assembly with the armrest in the highest possible position.

FIG. 2 demonstrates the highest locked position of the support lever 40. The preferred embodiment depicts five positions for the support lever 40, although the actual number may be more or less depending on practical limitations. It should be reiterated and noted that the ratchet wheel 56 has remained in a fixed position relative to bracket 14, while all other elements have moved with the lever 40. The biasing spring 49, one end of which is secured in the cable hub 46 continues to apply a force to the pawl 52 at all times.

Throughout the rotation of the support lever 40, the armrest 20 is also free to rotate clockwise, whereas in other prior art devices movement of the armrest would disengage the support lever. FIG. 3 shows the armrest 20 rotated upwards from a horizontal position shown in phantom through a substantially vertical position as shown. This enables easy cab access for the vehicle operator while still providing numerous positions for the support lever 40. In the preferred embodiment the armrest 20 rotates to a point approximately parallel with the back (not shown) of seat 12, when the support lever 40 is at its most vertical position.

To reset the height of the armrest 20, the support lever must be rotated as far clockwise as possible, rotated counterclockwise to the position depicted in FIG. 5, and rotated clockwise again until the desired height of the armrest 20 is obtained. As can be seen from FIG.'s 2, 5, and 6, the spring 49, pawl 52, and ratchet wheel 56 prevent the counterclockwise rotation of the support lever 40. To reset the support lever 40 and the height of the armrest 20 requires the disengagement of the locking between the pawl 52 and the ratchet wheel 56 to permit counterclockwise rotation of support lever 40.

The disengagement of the pawl 52 from the ratchet wheel 56 is demonstrated in FIGS. 2 and 3. From the uppermost engagement position depicted in FIG. 2, the support lever 40 is further rotated in a clockwise motion. The pawl disengaging shoulder 52b contacts the hub disengaging shoulder 56b, and as the lever 40 continues to rotate, the pawl tip 52a also rotates to a point that is outside the arc defined by the tip of the teeth 72. The pivoting of the pawl 52 ceases when the stop arm 52c of the pawl 52 contacts the perimeter of the ratchet wheel 56. The final increment of clockwise rotation of the support lever 40 forces the rear leg 52d of the pawl 52 into the notch 49a of spring 49. The direction of the force generated by the spring 49 through the notch 49a is now through or below pivot 54. The notch 49a thus holds the pawl 52 in disengagement from the ratchet wheel 56. This disengagement is maintained as the support lever 40 is rotated counterclockwise; that is, the tip 52a of the pawl 52 remains outside the arc circumscribed by the tips of teeth 72.

The reengagement of the pawl 52 with the ratchet wheel 5 occurs as the support lever 40 reaches its lowest position in a counterclockwise rotation as shown in FIG. 5. The actual reengagement is depicted in FIG. 4. The tip of the pawl 52a contacts reengaging tooth 74, which extends beyond the arc circumscribing the teeth 72. Continued rotational force applied to the support lever 40, such as a light downward push on the armrest 20, causes the pawl 52 to rotate counterclockwise about pivot 54. The tip of the pawl 52a is guided by the edge of reengaging tooth 74 into the first latched position as shown by FIG. 5 and the cross-hatched section in FIG. 4. As the tip 52a is engaged, the rear leg 52d of the pawl 52 is disengaged from notch 49a so that spring 49 now urges the pawl 52 into engagement with the ratchet wheel 56.

Certain features are preferred for the practice of the present invention. The inner arm 44 should be arcuately slotted in the vicinity of the ratchet wheel 56, knob 62 and cable 48. This permits dimensional clearance of the elements inside the inner arm 44. Also, the support washer assembly 43 covers the exterior arm 42 where the locknut 58, bolt 60, and a support washer (unshown) are located.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An adjustable armrest assembly comprising:
a support lever having one end pivotally mounted at a fixed location to permit movement of said support lever through an arc from a lower generally horizontal position to an upper generally vertical position;
an armrest having a rear end pivotally mounted to the other end of said support lever;
latch means for releasably locking said support lever in any one of a plurality of position between said lower and upper positions, said releasable locking being controlled by the movement of said support lever, and said latch means comprising a first latching member pivotally connected to said support lever engageable with a second latching member mounted to said support lever;
biasing means for selectively engaging and disengaging said latch means, said biasing means acting to engage said latch means when said support lever is moved from its lower position toward said upper position and acting to hold said locking means in disengagement as said support lever is moved from said upper position toward said lower position; and
a tension member extending from said armrest into said support lever to a fixed position relative to said latch means, said tension member maintaining contact with a tensioning means for maintaining said armrest in a generally horizontal orientation as said support lever is moved between its lower and upper positions.

2. The armrest assembly of claim 1 wherein said support lever is pivotally mounted to a supporting member.

3. The armrest assembly of claim 2 wherein said supporting member is securable in fixed relation to a seat assembly.

4. An adjustable armrest assembly comprising:
a support lever having one end pivotally mounted in a fixed position to permit movement of said support lever through an arc from a lower generally horizontal position to an upper generally vertical position;
an armrest having a rear end pivotally mounted to the other end of said support lever;
latch means for releasably locking said support lever in any one of a plurality of intermediate positions between said lower and upper positions, said latch means comprising a pawl pivotally mounted to said support lever engageable with a ratchet wheel fixedly mounted in said support lever;
biasing means for selectively holding said pawl in engagement and disengagement from said ratchet wheel, said biasing means acting to hold said pawl in engagement with said ratchet wheel as said lever is moved from said lower position toward said upper position and acting to hold said pawl in disengagement from said ratchet wheel as said support lever is moved from said upper position toward said lower position; and
a tension member extending from said armrest into said support lever to a fixed position relative to said ratchet wheel, said tension member maintaining operative contact with a bearing means for maintaining said armrest in a generally horizontal orientation as said support lever is moved between its lower and upper positions.

5. The armrest assembly of claim 4 wherein said support lever is pivotally mounted to a fixed supporting member that is securable in fixed relation to a seat assembly.

6. The armrest assembly of claim 5 wherein said ratchet wheel is fixedly mounted to said support member and said support lever is pivotally mounted relative to said ratchet wheel.

7. The armrest assembly of claim 5 wherein said tension member is a cable.

8. An adjustable armrest assembly comprising:
a supporting member securable in fixed relation to a seat assembly;
a support lever having one end pivotally mounted to said supporting member to permit movement of said support lever through an arc from a lower generally horizontal position to an upper generally vertical position;
an armrest having a rear end pivotally mounted to the other end of said lever;
latch means for releasably locking said supporting lever in any one of a plurality of positions between said lower and upper positions, said latch means comprising a ratchet wheel fixedly mounted inside said support lever and engageable with a pawl pivotally mounted to said support lever;
biasing means for selectively holding said pawl in engagement with or disengagement from said ratchet wheel, said biasing means acting to hold said pawl in engagement with said ratchet wheel as said support lever is moved from said lower position toward said upper position and acting to hold said pawl in disengagement from said ratchet wheel as said lever is moved from said upper position toward said lower position; and
a tension member extending from said armrest through its rear end and through said support lever to a fixed location proximate of the pivotally mounted end of said support lever, said tension member maintaining contact with a tensioning means mounted to said support lever for maintaining said armrest in a generally horizontal position as said support lever is moved between its lower and upper positions.

9. The armrest assembly of claim 8 further comprising means for controlling the horizontal orientation of said armrest, said control means being operatively connected to said tension member.

10. The armrest assembly of claim 8 wherein said pawl further comprises abutment means, engageable with said ratchet wheel, for disengaging said pawl from said ratchet wheel to permit movement of said support lever from said upper vertical position toward said lower horizontal position.

11. The armrest assembly of claim 8 wherein said ratchet wheel further comprises means for moving said pawl from disengagement to engagement with said ratchet wheel.

12. The armrest assembly of claim 11 wherein one end of said tension member is a cable fixed to said ratchet wheel.

13. An adjustable armrest assembly comprising:
a supporting member securable in fixed relation to a seat assembly;
a support lever having one end pivotally mounted to said supporting member to permit movement of said lever through an arc from a lower generally horizontal position to an upper generally vertical position;
an armrest having a rear end pivotally mounted to the other end of said support lever;
a ratchet wheel mounted to said support lever in fixed relation to said supporting member;
a pawl pivotally mounted to and movable with said support lever and responsive to the movement of said support lever for releasably locking said ratchet wheel in any one of a plurality of positions between said lower and upper positions;
biasing means for selectively holding said pawl in engagement with or disengagement from said ratchet wheel, said biasing means acting to hold said pawl in engagement with said ratchet wheel a said support lever is moved from said lower position toward said upper position and acting to hold said pawl in disengagement from said ratchet wheel as said support lever is moved from said upper position toward said lower position;
a cable sliding surface mounted in fixed relation relative to said support lever; and
a cable extending from said armrest through its rear end, around said cable sliding surface, and attached at a location in fixed relation to the pivot point of said supporting member and said support lever.

14. The armrest assembly of claim 13 wherein said ratchet wheel and said pawl include cooperative abutment means for disengaging said ratchet wheel and said pawl.

15. The armrest assembly of claim 14 further comprising means for reengaging said pawl with said ratchet wheel.

16. The armrest assembly of claim 15 further comprising means for maintaining said pawl in disengagement from said ratchet wheel while said support level is moved from said upper position toward said lower position.

17. The armrest assembly of claim 16 wherein said maintaining means is a notch in said biasing means.

18. The armrest assembly of claim 17 further comprising means for adjusting said cable to control the pivotal location of said armrest about a substantially horizontal orientation.

19. The armrest assembly of claim 18 wherein said armrest is pivotable to an orientation substantially collinear with said support lever when said support lever is in its generally horizontal and vertical positions.

* * * * *